(12) United States Patent
Muraoka et al.

(10) Patent No.: US 9,489,632 B2
(45) Date of Patent: Nov. 8, 2016

(54) MODEL ESTIMATION DEVICE, MODEL ESTIMATION METHOD, AND INFORMATION STORAGE MEDIUM

(71) Applicant: NEC Corporation, Tokyo (JP)

(72) Inventors: Yusuke Muraoka, Tokyo (JP); Ryohei Fujimaki, Tokyo (JP)

(73) Assignee: NEC Corporation, Tokyo (JP)

( * ) Notice: Subject to any disclaimer, the term of this patent is extended or adjusted under 35 U.S.C. 154(b) by 280 days.

(21) Appl. No.: 14/066,265

(22) Filed: Oct. 29, 2013

(65) Prior Publication Data

US 2015/0120638 A1    Apr. 30, 2015

(51) Int. Cl.
*G06N 5/04* (2006.01)
*G06N 7/00* (2006.01)

(52) U.S. Cl.
CPC ..................................... *G06N 7/005* (2013.01)

(58) Field of Classification Search
CPC ...... G06N 7/005; G06N 99/005; G06N 5/04; G06N 5/02; G06N 5/048; G06F 17/50; G06F 17/16
USPC .................................... 706/12, 46, 52; 703/2
See application file for complete search history.

(56) References Cited

U.S. PATENT DOCUMENTS

| 7,480,640 | B1 * | 1/2009 | Elad | G06Q 10/10 706/14 |
| 7,499,897 | B2 * | 3/2009 | Pinto | G06Q 30/02 706/11 |
| 2012/0323834 | A1 * | 12/2012 | Fujimaki | G06N 5/02 706/46 |
| 2013/0211801 | A1 * | 8/2013 | Fujimaki | G06F 17/18 703/2 |
| 2013/0325782 | A1 * | 12/2013 | Fujimaki | G06N 7/005 706/46 |
| 2014/0222741 | A1 * | 8/2014 | Eto | G06N 7/005 706/46 |
| 2014/0343903 | A1 * | 11/2014 | Fujimaki | G06F 17/18 703/2 |
| 2014/0344183 | A1 * | 11/2014 | Fujimaki | G06Q 10/067 705/348 |
| 2015/0088789 | A1 * | 3/2015 | Motohashi | G06N 99/005 706/12 |

OTHER PUBLICATIONS

Blei D. et al., "Variational Inference for Dirichlet Process Mixtures", Bayesian Analysis, No. 1, pp. 121-144, 2006.*
Fei-Fei L. et al., "A Bayesian Hierarchical Model for Learning Natural Scene Categories", Computer Vision and Pattern Recognition, 2005. CVPR 2005. IEEE Computer Society Conference on. vol. 2. IEEE, 2005.*
Fujimaki R. et al., "Factorized Asymptotic Bayesian Inference for Mixture Modeling", Appearing in Proceedings of the 15th International Conference on Artificial Intelligence and Statistics (AISTATS), 2012, La Palma, Canary Islands. vol. XX of JMLR:W& CP XX.*
Blei, David M., Andrew Y. Ng, and Michael I. Jordan, Latent Dirichlet Allocation, the Journal of Machine Learning Research 3 (2003): pp. 993-1022.
Teh, Yee Whye, et al., "Sharing Clusters Among Related Groups: Hierarchical Dirichlet Processes," the Journal of the American Statistical Association 101.476 (2006), 8 pages.

* cited by examiner

*Primary Examiner* — Stanley K Hill
*Assistant Examiner* — Dave Misir
(74) *Attorney, Agent, or Firm* — Wilmer Cutler Pickering Hale and Dorr LLP (57) ABSTRACT

A model estimation device includes: a data input unit; a state number setting unit; an initialization unit which sets initial values of a variational probability of a latent variable, a parameter, and the type of each component; a latent variable variational probability computation unit which computes the variational probability of the latent variable so as to maximize a lower bound of a marginal model posterior probability; a component optimization unit which estimates an optimal type of each component and a parameter thereof so as to maximize the lower bound of the marginal model posterior probability separated for each component of the latent variable model; an optimality determination unit which determines whether or not to continue the maximization of the lower bound of the marginal model posterior probability; and a result output unit which outputs a result.

12 Claims, 4 Drawing Sheets

MODEL ESTIMATION DEVICE, MODEL ESTIMATION METHOD, AND INFORMATION STORAGE MEDIUM

FIELD OF THE INVENTION

The present invention relates to a model estimation device and model estimation method for estimating hierarchical latent variable models for multivariate data, and a computer-readable information storage medium storing a model estimation program for estimating hierarchical latent variables models for multivariate data.

BACKGROUND ART

In ordinary documents, for example, documents with topics in the same field are similar in description as compared with documents with topics in different fields. Moreover, retail stores with the same locational condition are similar in sales of specific products. The locational condition is information of, for instance, whether the store is located in a business district, near a station, or in a suburb. Thus, in many types of data, an actually observed variable (the above-mentioned "description" or "sales") changes according to the value of another factor that is unobservable (the above-mentioned "topic" or "store location").

Estimating unobservable variables(latent variables) in such data is applicable to industrially important situations. As an example, by estimating documents with the same topic, a user can specify a document group that meets the search intention and a document group that does not meet the search intention from among searched-for documents, thus obtaining desired documents more quickly. As another example, by estimating stores with the same store sales factor, a user can specify in which store a product sold well in a specific store should be introduced to achieve good sales, upon deciding the range of products in each store.

Mixture distribution models are typically employed to estimate such unobservable factors. In addition, models hierarchically using mixture distribution parameters are employed to represent situations where an observed variable creation factor is similar for each set of specific samples (e.g. a similar factor for documents, a similar factor for stores). For instance, models called "Latent Dirichlet Allocation (LDA)" described in Non Patent Literature (NPL) 1 are used in the case of natural sentences.

In NPL 1, each document is represented by words (observed variables), the words in each document have latent states, and a parameter that is set for each document defines latent variable occurrence probabilities. Further, in NPL 1, how these parameters are likely to occur is indicated using a parameter common to the whole documents. In NPL 1, the tendencies of topics depending on documents are expressed by creating such models.

In NPL 1, there is a problem that the parameters and the latent states cannot be estimated unless the number of latent states is set beforehand. To solve this problem, in NPL 2, the estimation is performed by assuming models in which the number of latent states and the parameters are created by a Dirichlet process. A nonparametric Bayesian method using a Dirichlet process, however, has a problem of extremely high computational complexity.

CITATION LIST

Non Patent Literature

NPL 1: Blei, David M., Andrew Y. Ng, and Michael I. Jordan "Latent dirichlet allocation" the Journal of Machine Learning Research 3 (2003): 993-1022.

NPL 2: Teh, Yee Whye, et al. "Hierarchical dirichlet processes" Journal of the American Statistical Association 101.476 (2006).

SUMMARY OF THE INVENTION

There is also a method of determining the number of latent states by approximating a complete marginal likelihood function and maximizing its lower bound (lower limit) for mixture models which are a typical example of latent variable models. This method can reduce the computational complexity as compared with the nonparametric Bayesian method, and estimate the number of latent states, the latent states, and the parameters at high speed.

However, this method is not applicable to models in which the number of parameters increases with samples, for the following reason. In the method, an integral in the parameters is approximated by Laplace approximation in order to approximate the complete marginal likelihood function. In models in which the number of parameters increases with samples, however, the precondition for Laplace approximation does not hold, causing a significant approximation error. Since LDA has a parameter for each document, the number of parameters increases with samples.

An exemplary object of the present invention is to provide a model estimation device, model estimation method, and information storage medium that can estimate the number of latent states, the latent states, and the parameters at high speed for latent variable models in which the number of parameters increases with samples, without losing theoretical validity.

A model estimation device according to an exemplary aspect of the present invention includes: a data input unit which acquires observed value data subjected to estimation of a latent variable model, a type of each component constituting the latent variable model, and a state number candidate set of the latent variable model; a state number setting unit which sets an element for which computation has not been completed yet in the state number candidate set, as the number of states; an initialization unit which sets setting initial values of a variational probability of a latent variable, a parameter, and the type of each component; a latent variable variational probability computation unit which acquires the observed value data and the variational probability of the latent variable, the type of each component, and the parameter set by the initialization unit, and computes the variational probability of the latent variable so as to maximize a lower bound of a marginal model posterior probability; a component optimization unit which acquires the observed value data and the variational probability of the latent variable, the type of each component, and the parameter set by the initialization unit, and estimates an optimal type of each component and a parameter thereof by optimizing the type of each component and the parameter so as to maximize the lower bound of the marginal model posterior probability separated for each component of the latent variable model; an optimality determination unit which acquires the observed value data, the type of each component and the parameter thereof estimated by the component optimization unit, and the variational probability of the latent variable computed by the latent variable variational probability computation unit, and determining whether or not to continue the maximization of the lower bound of the marginal model posterior probability; and a result output unit which outputs the variational probability of the latent variable computed by the latent variable variational probability computation unit and the type of each component and the parameter thereof estimated by the component optimization unit.

A model estimation method according to an exemplary aspect of the present invention includes: acquiring observed value data subjected to estimation of a latent variable model, a type of each component constituting the latent variable model, and a state number candidate set of the latent variable model; setting an element for which computation has not been completed yet in the state number candidate set, as the number of states; setting initial values of a variational probability of a latent variable, a parameter, and the type of each component; acquiring the observed value data and the variational probability of the latent variable, the type of each component, and the parameter to which the initial values are set, and computing the variational probability of the latent variable so as to maximize a lower bound of a marginal model posterior probability; acquiring the observed value data and the variational probability of the latent variable, the type of each component, and the parameter to which the initial values are set, and estimating an optimal type of each component and a parameter thereof by optimizing the type of each component and the parameter so as to maximize the lower bound of the marginal model posterior probability separated for each component of the latent variable model; acquiring the observed value data, the computed variational probability of the latent variable, and the estimated type of each component and parameter thereof, and determining whether or not to continue the maximization of the lower bound of the marginal model posterior probability; and outputting the computed variational probability of the latent variable and the estimated type of each component and parameter thereof.

An information storage medium according to an exemplary aspect of the present invention is a computer-readable non-transitory information storage medium storing a model estimation program that, when executed by an information processing device, causes execution of a method including: acquiring observed value data subjected to estimation of a latent variable model, a type of each component constituting the latent variable model, and a state number candidate set of the latent variable model; setting an element for which computation has not been completed yet in the state number candidate set, as the number of states; setting initial values of a variational probability of a latent variable, a parameter, and the type of each component; acquiring the observed value data and the variational probability of the latent variable, the type of each component, and the parameter to which the initial values are set, and computing the variational probability of the latent variable so as to maximize a lower bound of a marginal model posterior probability; acquiring the observed value data and the variational probability of the latent variable, the type of each component, and the parameter to which the initial values are set, and estimating an optimal type of each component and a parameter thereof by optimizing the type of each component and the parameter so as to maximize the lower bound of the marginal model posterior probability separated for each component of the latent variable model; acquiring the observed value data, the computed variational probability of the latent variable, and the estimated type of each component and parameter thereof, and determining whether or not to continue the maximization of the lower bound of the marginal model posterior probability; and outputting the computed variational probability of the latent variable and the estimated type of each component and parameter thereof.

According to the present invention, it is possible to solve the model selection problem and estimate the number of latent states, the latent states, and the parameters at high speed for latent state models in which the number of parameters increases with samples, without losing theoretical validity.

DESCRIPTION OF THE PREFERRED EMBODIMENTS

The following describes exemplary embodiments of the present invention with reference to drawings.

Models to be estimated in each exemplary embodiment are described below. An observed variable $x_{ij}$ is represented as in the following Expression (1).

$$x_{ij} \; i\in\{1,\ldots,N\}, j\in\{1,\ldots,N_i\} \tag{1}$$

A latent variable $z_{ij}$ corresponding to the observed variable is represented as in the following Expression (2) (where K is the number of types of latent states).

$$z_{ij} \in \{0,1\}^K, \sum_k z_{ij,k} = 1 \tag{2}$$

Suppose the observed variable $x_{ij}$ is created from a regular model that differs according to the value of the latent variable $z_{ij}$. In this case, the observed variable $x_{ij}$ is represented as in the following Expression (3). $\phi$ means a parameter of a probability model determined according to a latent variable.

$$x_{ij} \sim P_k(x_{ij}|\phi_{(k)}) \text{ if } z_{ij,k}=1 \tag{3}$$

Several types of models are assumed for $P_k$ shown in Expression (3), where the types are denoted by H. For example, assuming that one model is selected from M models for each component, the component is represented by a matrix in which $1,\ldots,K$ are associated with any of $1,\ldots,M$. A parameter for determining the creation of the latent variable $z_{ij}$ is denoted by $\theta_i$ (where latent variables are created from the same parameter for each i), and referred to as "latent variable creation distribution parameter". It is assumed that $z_{ij}$ is created from a given regular model. In this case, $z_{ij}$ is represented as in the following Expression (4).

$$z_{ij} \sim P(z_{ij}|\theta_i) \tag{4}$$

Moreover, it is assumed that a prior distribution of $\theta_i$ can be formed as follows. It is assumed that $p(z_{ij}|\alpha)$ which is a prior distribution having a hyperparameter $\alpha$ and corresponds to $z_{ij}$ marginalizing $\theta_i$ is analytically computed as shown in the following Expression (5) and is a regular model.

$$p(z_{ij} \mid \alpha) = \int \prod_f p(z_{ij} \mid \theta_i) p(\theta_i \mid \alpha) d\alpha \qquad (5)$$

The following describes a method for realizing model selection and parameter estimation for mixture models mentioned above. Note, however, that models to be estimated are not limited to mixture models, so long as they are latent variables models. The model estimation device in each of the exemplary embodiments computes a model parameter and a variational probability of a latent variable so as to maximize a lower bound of a marginal model posterior probability. In the following description, the variational probability of the latent variable is also simply referred to as "variational probability". The marginal model posterior probability is a model posterior probability of a model marginalizing the latent variable creation distribution parameter $\theta_i$ as shown in the following Expression (6).

$$p(x \mid \phi, \alpha) = \sum_z \int p(x \mid z) p(z \mid \theta) p(\theta \mid \alpha) d\theta \qquad (6)$$

In the above-mentioned example, parameters that increase in number with samples are the latent variable creation distribution parameter $\theta_i$.

Exemplary Embodiment 1

Figure 1:
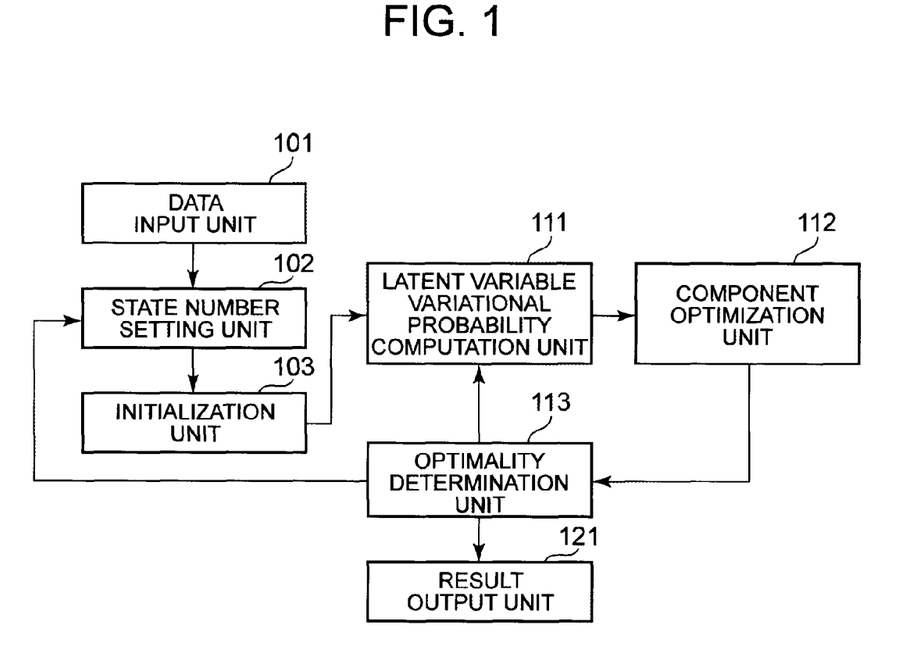
FIG. 1 is a block diagram showing a structure of Exemplary Embodiment 1 of a model estimation device according to the present invention.

The following describes a structure of a model estimation device in Exemplary Embodiment 1. FIG. 1 is a block diagram showing the structure of Exemplary Embodiment 1 of the model estimation device. The model estimation device includes a data input unit 101, a state number setting unit 102, an initialization unit 103, a latent variable variational probability computation unit 111, a component optimization unit 112, an optimality determination unit 113, and a result output unit 121.

The structure shown in FIG. 1 is realized, for example, by an information processing device such as a CPU (Central Processing Unit) operating according to a program or hardware designed to perform specific computation and the like. The program is stored in a computer-readable non-transitory information storage medium.

The model estimation device in this exemplary embodiment is described below, using mixture models as latent variables models.

The data input unit 101 acquires observed value data subjected to estimation of a mixture model, a type (type candidate) and parameter of each component constituting the mixture model, a set (state number candidate set) of candidates for the number of states selected by a latent variable, and a threshold for convergence determination. Hereafter, the type of each component constituting the mixture model is simply referred to as "component type".

The state number setting unit 102 sets a number of an element for which computation has not been completed yet in the state number candidate set, as the number of states.

The initialization unit 103 sets initial values of the variational probability of the latent variable, the parameter, and the component type. The variation probability of the latent variable is an approximate value of the posterior probability of the latent variable to calculate a marginal likelihood. In detail, the initialization unit 103 initializes the component type, the variational probability of the latent variable, and the parameter of each component for estimation, according to the number of states set by the state number setting unit 102. For example, the initialization unit 103 randomly selects the component type, randomly sets the initial value of the parameter according to the selected type, and randomly sets the initial value of the variational probability of the latent variable.

The latent variable variational probability computation unit 111 estimates the variational probability of the latent variable, using the currently set component type and parameter. In detail, the latent variable variational probability computation unit 111 acquires the observed value data, and the component type, model parameter, and variational probability of the latent variable set by the initialization unit 103. In the case where it is determined in the below-mentioned optimality determination that the convergence has not been completed and so the computation process is to be performed again, the latent variable variational probability computation unit 111 acquires the type of each component and the model parameter previously output from the component optimization unit 112 and the variational probability of the latent variable previously output from the latent variable variational probability computation unit 111.

The latent variable variational probability computation unit 111 computes the variational probability $q(z)$ of the latent variable so as to maximize the lower bound of the marginal model posterior probability, using these acquired data. The marginal model posterior probability is the model posterior probability calculated about probability distribution that a parameter to increase with a sample is removed by integral calculus in the prior distribution. The lower bound of the marginal model posterior probability is described below. The marginal model posterior probability is represented as in the following Expression (7-3), derived by substituting the Expression (7-1) into the Expression (7-2).

$$p(z_i, \mid \alpha) = \int \prod_f p(z_{ij} \mid \theta_i) p(\theta_i \mid \alpha) d\alpha \qquad (7-1)$$

$$\log p(x \mid M) = \log \sum_z \int p(x, z, \theta, \phi, \alpha) d\theta d\phi d\alpha \qquad (7-2)$$

$$= \log \sum_z \int p(x \mid z, \phi) p(z \mid \theta, \alpha) p(\theta) p(\phi, \alpha) d\theta d\phi d\alpha$$

$$\log p(x^N \mid M) = \log \sum_z \int p(\phi, \alpha) \prod_j p(z_i, \mid \alpha) \prod_j p(x_{ij} \mid z_{ij}, \phi) d\phi d\alpha \qquad (7-3)$$

The lower bound in the second expression in Expression (7) can be represented using the variational probability q(z) as in the following Expression (8).

$$\log p(x^N \mid M) \geq \qquad (8)$$

$$\sum_z q(z^N) \left[ \log \sum_z \int p(z\phi, \alpha) \prod_j p(z_i \mid \alpha) \prod_j p(x_{ij}, \phi) d\phi d\alpha - \log q(z^N) \right]$$

Laplace-approximating the integral on the right side of Expression (8) yields the lower bound as shown in the following Expression (9). K is the number of possible states, and $D_k(H)$ is the degree of freedom of the model of the component k in the case where the model of each component is selected in H.

$$\log p(x^N \mid M) \geq \sum_z q(z^N) \left[ \log p(x_N \mid z_N, \hat{\phi}) + \log p(z_N \mid \hat{\alpha}) - \frac{K}{2} \log N - \sum_k \frac{D_k(H)}{2} \log \sum_{i,j} z_{ij,k} - \log q(z_N) \right] \qquad (9)$$

Furthermore, based on the fact that the logarithm function is a concave function, the lower bound is computed as shown in the following Expression (10).

$$\log p(x^N \mid M) \geq \sum_z q(z^N) \left[ \log p(x_N \mid z_N, \hat{\phi}) + \log p(z_N \mid \hat{\alpha}) - \frac{K}{2} \log N - \sum_k \frac{D_k(H)}{2} \left( \log \sum_{i,j} \tilde{q}(z_{ij,k}) + \frac{\sum_{i,j} z_{ijk}}{\sum_{i,j} \tilde{q}(z_{ij,k})} - 1 \right) - \log q(z_N) \right] = g(H, q, \tilde{q}, \phi, \alpha) \qquad (10)$$

The latent variable variational probability computation unit 111 finds such q that maximizes the function of the lower bound. The function of the lower bound is referred to as "optimization criterion". q (tilded) is maximum when the value of q at the immediately previous update is used. Accordingly, the latent variable variational probability computation unit 111 assigns the value of q at the immediately previous update, to q (tilded). The value of each variational probability and parameter at the t-th update is designated by the superscript (t). The latent variable variational probability computation unit 111 computes the value of the variational probability as shown in the following Expression (11).

$$q^{(t)} = \arg\max_q g(H^{(t-1)}, q, q^{(t-1)}, \phi^{(t-1)}, \alpha^{(t-1)}) \qquad (11)$$

The component optimization unit 112 acquires the observed value data acquired by the data input unit 101 and component type, the model parameter and the variational probability of the latent variable set by the initialization unit 103. In the case where it is determined in the below-mentioned optimality determination that the convergence has not been completed and so the computation process is to be performed again, the component optimization unit 112 acquires the type of each component and the model parameter previously output from the component optimization unit 112 and the variational probability of the latent variable previously output from the latent variable variational probability computation unit 111.

The component optimization unit 112 estimates the component type and parameter, based on the acquired variational probability of the latent variable. The component optimization unit 112 estimates an optimal component type and parameter so as to maximize the lower bound of the marginal model posterior probability separated for each component of the mixture model, by optimizing the component type H and parameter $\phi$.

The component optimization unit 112 finds the lower bound in the same way as the latent variable variational probability computation unit 111, and computes the component type and parameter as in the following Expression (12). This lower bound can be computed for each component. Therefore, the component optimization unit 112 can optimize the component type, with no need for computation for all combinations of component types.

$$(H^{(t)}, \phi^{(t)}, \alpha^{(t)}) = \arg\max_{H,\phi,\alpha} g(H, q^{(t)}, q^{(t)}, \phi, \alpha) \qquad (12)$$

The optimality determination unit 113 acquires the observed value data acquired by the data input unit 101, the model parameter and component type output from the component optimization unit 112, and the variational probability of the latent variable calculated by the latent variable variational probability computation unit 111. The optimality determination unit 113 determines whether or not to continue the maximization of the marginal model posterior probability, based on these acquired data. In detail, the optimality determination unit 113 determines whether or not to continue the maximization, by determining whether or not the procedure of maximizing the lower bound of the marginal model posterior probability has converged. For example, the optimality determination unit 113 determines whether or not the difference from the optimization criterion at the previous update is sufficiently small, and determines to end the maximization if the difference is small and to continue the maximization if the difference is large. The optimality determination unit 113 may determine whether or not the procedure of maximizing the lower bound of the marginal model posterior probability has converged, using the threshold for convergence determination acquired by the data input unit 101.

In the case of determining to continue the maximization, the optimality determination unit 113 sends the variational probability of the latent variable and the component type and parameter to the latent variable variational probability computation unit 111. In the case of determining to end the maximization, the optimality determination unit 113 enforces, if there is any element for which the computation has not been completed yet in the input state number candidate set, the computation for the element. If the computation has been completed for all state number candidates, the optimality determination unit 113 sends the variational probability of the latent variable and the component type and parameter for the number of states corresponding to the largest optimization criterion of all state number candidates, to the result output unit 121.

Thus, the model estimation device in this exemplary embodiment repeatedly performs the process of computing the variational probability of the latent variable and the component type and parameter until the optimization criterion converges. The optimization criterion increases at every process.

The result output unit 121 outputs the acquired variational probability of the latent variable and component type and parameter, as the model estimation result.

Latent states show a value to be set in a latent variable. A number of latent states show the number of candidates of the value to be set in a latent variable. The user can determine the number of latent states and the latent states, from the variational probability of the latent variable. For example, the user can select a latent state with a largest variational probability, from a plurality of latent states corresponding to each sample (observed value). The user can also set the number of latent states corresponding to a positive sum of variational probabilities in each sample, as the number of latent states.

Figure 2:
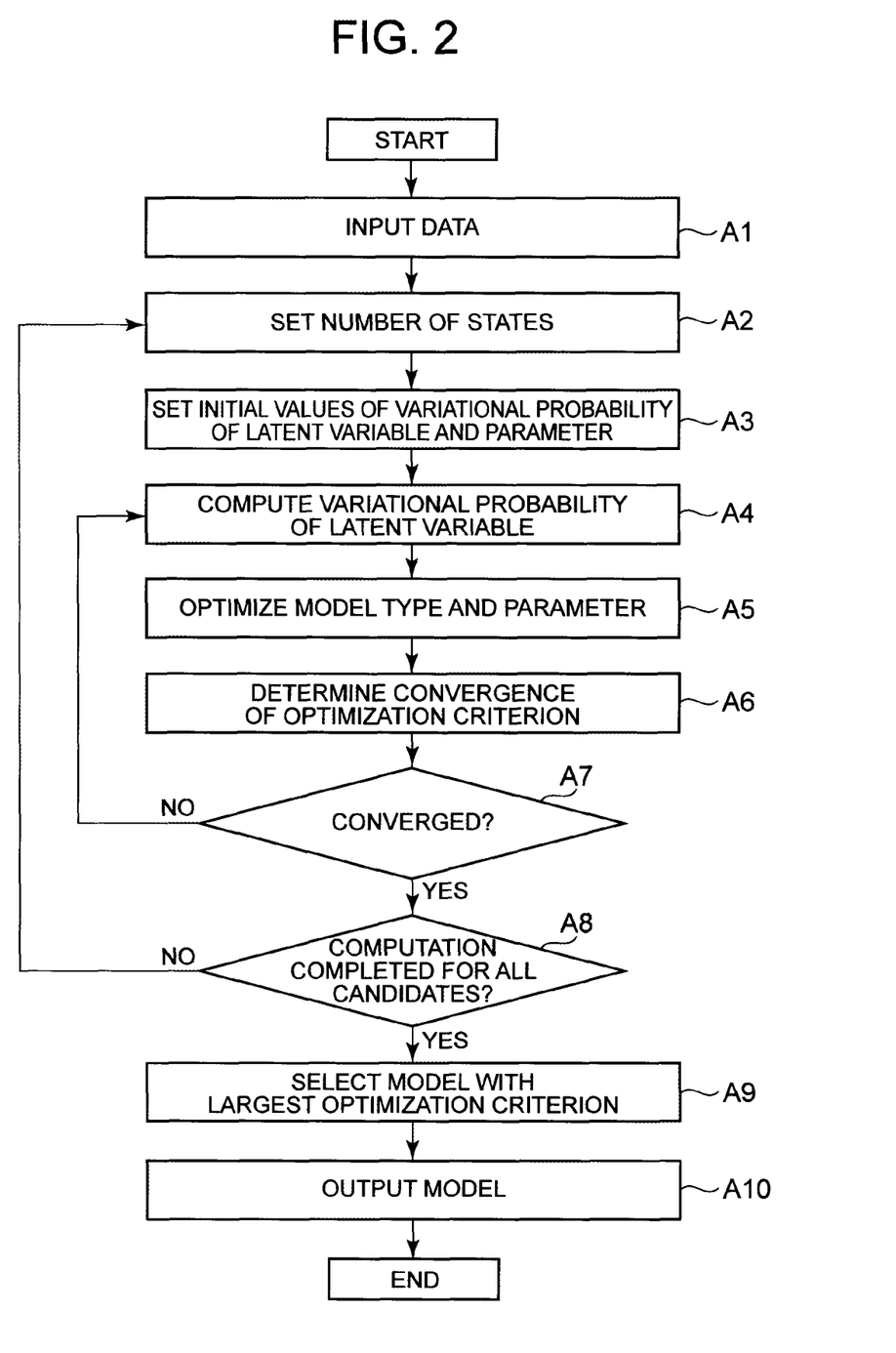
FIG. 2 is a flowchart showing an operation of Exemplary Embodiment 1 of the model estimation device according to the present invention.

The following describes an operation of the model estimation device in this exemplary embodiment. FIG. 2 is a flowchart showing the operation of the model estimation device in this exemplary embodiment.

First, the data input unit 101 receives input of data including the observed value data, the component type (type candidate), the state number candidate set, and the convergence determination criterion (step A1).

Next, the state number setting unit 102 sets a number of an element for which the computation has not been performed yet in the state number candidate set, as the number of states (step A2).

Next, the initialization unit 103 initializes the variational probability of the latent variable, the component type, and the model parameter according to the number of states (step A3).

Next, the latent variable variational probability computation unit 111 computes the variational probability of the latent variable so as to maximize the lower bound of the marginal model posterior probability (step A4).

Next, the component optimization unit 112 computes the model type (component type) and the model parameter so as to maximize the lower bound of the marginal model posterior probability (step A5).

Next, the optimality determination unit 113 determines whether or not the optimization criterion has converged (step A6). If the optimization criterion has not converged, the process returns to step A4 to repeat the estimation of the variational probability of the latent variable and the component type and parameter. If the optimization criterion has converged, the process proceeds to step A8 (step A7).

The optimality determination unit 113 then determines whether or not the computation has been completed for all input state number candidates (step A8). If the computation has not been completed, the process from steps A3 to A7 is repeated. If the computation has been completed, the optimality determination unit 113 selects the model with the largest optimization criterion from the computed model selection results (step A9). The result output unit 121 outputs the selected model (step A10).

The model estimation device realizes model selection and model estimation as described above. Though this exemplary embodiment describes the procedure of computing the variational probability of the latent variable and then computing the model type and the model parameter, this order may be reversed.

With the use of the model estimation device in this exemplary embodiment, the user can determine the number of latent states and the latent states from the variational probability of the latent variable. Moreover, the model estimation device in this exemplary embodiment is not affected by parameters that increase in number with samples, so that the estimation error can be reduced.

Exemplary Embodiment 2

Figure 3:
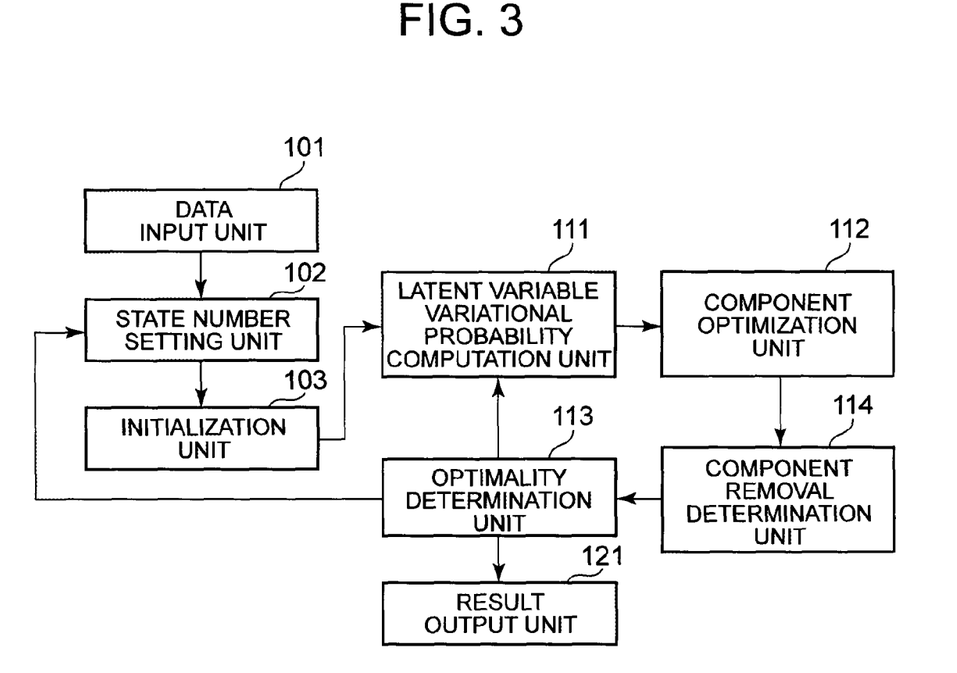
FIG. 3 is a block diagram showing a structure of Exemplary Embodiment 2 of the model estimation device according to the present invention.

The following describes Exemplary Embodiment 2 of the model estimation device. FIG. 3 is a block diagram showing a structure of the model estimation device in Exemplary Embodiment 2. The model estimation device in Exemplary Embodiment 2 includes a component removal determination unit 114 in addition to the structure of the model estimation device in Exemplary Embodiment 1.

The structure shown in FIG. 3 is realized, for example, by an information processing device such as a CPU (Central Processing Unit) operating according to a program or hardware designed to perform specific computation and the like. The program is stored in a computer-readable non-transitory information storage medium.

The component removal determination unit 114 determines whether or not to estimate that latent variable variational probabilities of a component are all 0, based on the latent variable variational probabilities acquired from the component optimization unit 112.

A component removal determination unit acquires the latent variable variational probabilities and, for each component, setting variational probabilities of the component to 0 if a sum of the variational probabilities is less than a threshold. In the case where the component k satisfies the following Expression (13), the component removal determination unit 114 estimates that the latent variable variational probabilities of the component are all 0.

$$\sum_{i,j} q(z_{ij,k}) < \epsilon \qquad (13)$$

With the provision of the component removal determination unit 114, the model estimation device in this exemplary embodiment can more quickly estimate the component whose latent variable variational probability sum converges to 0, as 0. The model estimation device in this exemplary embodiment is thus capable of model estimation at higher speed.

Figure 4:
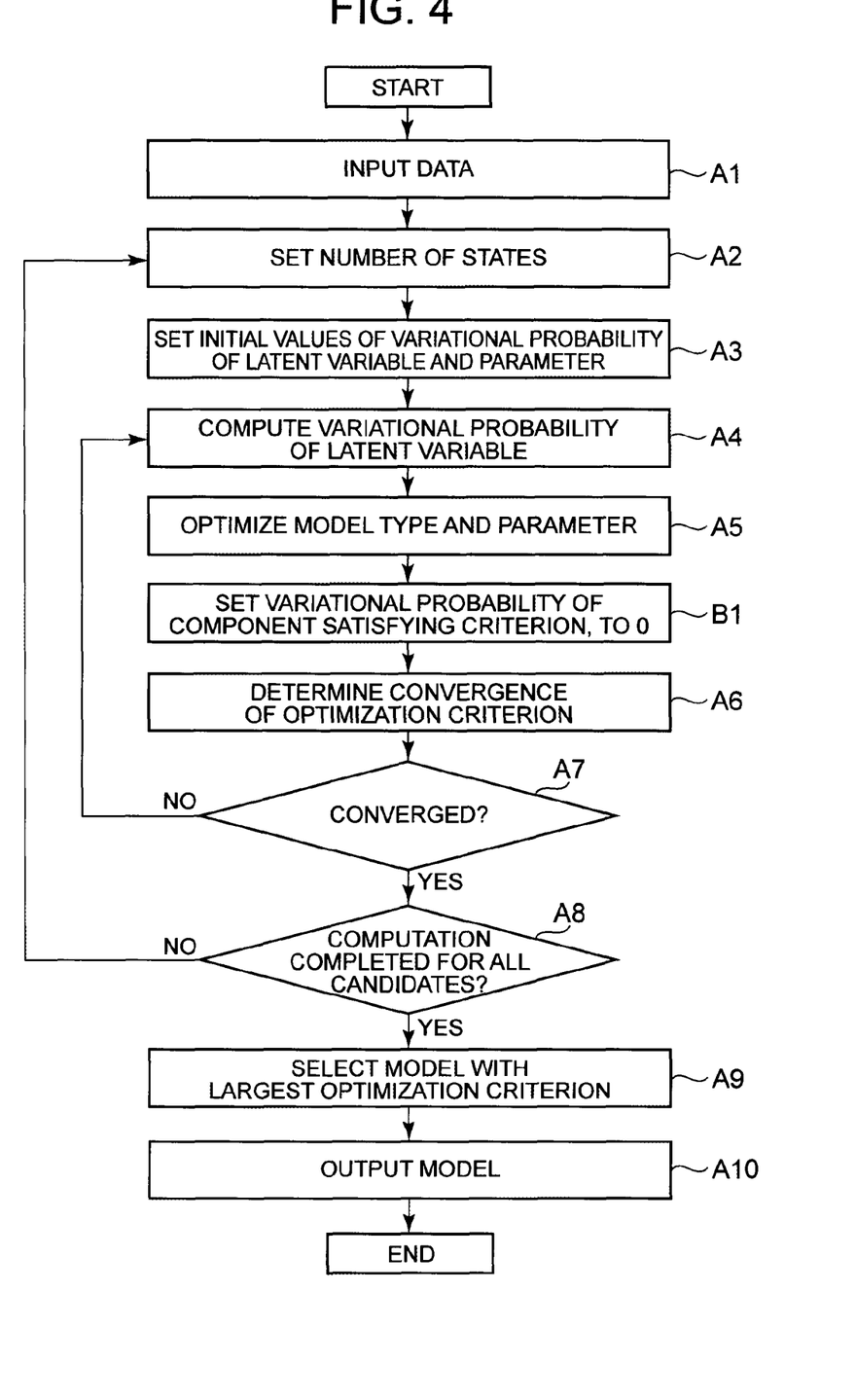
FIG. 4 is a flowchart showing an operation of Exemplary Embodiment 2 of the model estimation device according to the present invention.

The following describes an operation of the model estimation device in this exemplary embodiment. FIG. 4 is a flowchart showing the operation of the model estimation device in Exemplary Embodiment 2. The operation other than step B1 shown in FIG. 4 is the same as the operation in Exemplary Embodiment 1 shown in FIG. 2, and so its description is omitted.

After step A5, the component removal determination unit 114 sets the variational probabilities of any component whose variational probability sum is less than a threshold, to 0 (step B1).

The following describes examples of the model estimation device according to the present invention.

EXAMPLE 1

Various Mixture Distributions

With the use of the model estimation device proposed in each of Exemplary Embodiments 1 and 2, the mixture number and the type of distribution of each component can be optimized for a plurality of different mixture distributions.

Its application to operational risk estimation is described as an example below. A risk distribution in this example is typically a distribution of mixture of a group of multiple events with low risks and a group of low-frequency events with high risks. The group of multiple events with low risks, for example, is clerical mistakes and the like, and is modeled by a lognormal distribution. The group of low-frequency events with high risks, for example, is stock order mistakes and the like, and is modeled by a normal distribution having a high mean value.

For instance, each branch office is likely to have different event distributions. Even when each branch office has different event distributions, the model estimation device in each of Exemplary Embodiments 1 and 2 can automatically determine the appropriate types, number, and parameters of distributions and estimate the risk distribution.

The model estimation device in each of Exemplary Embodiments 1 and 2 is not limited to examples of normal distribution, lognormal distribution, and exponential distribution, but is applicable to any types of distributions.

EXAMPLE 2

Latent Dirichlet Allocation

The model estimation device in each of Exemplary Embodiments 1 and 2 is also applicable to Latent Dirichlet Allocation models described in NPL 1. This enables the user to select models based on appropriate criteria at high speed, without manually tuning the number of topics.

For instance, in the case of clustering search result document sets so that the search results can be recognized at a glance, the number of clusters is different depending on the search result set. The model estimation device in each of Exemplary Embodiments 1 and 2 can tune the number of topics at high speed and estimate the topics belonging to each set, and so is applicable to the case of clustering many document sets.

A structure of main parts of a model estimation device according to the present invention is described below, with reference to FIG. 1. The model estimation device according to the present invention includes, as main structural elements: a data input unit 101 which acquires observed value data subjected to estimation of a latent variable model, a type of each component constituting the latent variable model, and a state number candidate set of the latent variable model; a state number setting unit 102 which sets an element for which computation has not been completed yet in the state number candidate set, as the number of states; an initialization unit 103 which sets initial values of a variational probability of a latent variable, a parameter, and the type of each component; a latent variable variational probability computation unit 111 which acquires the observed value data and the variational probability of the latent variable, the type of each component, and the parameter set by the initialization unit, and computes the variational probability of the latent variable so as to maximize a lower bound of a marginal model posterior probability; a component optimization unit 112 which acquires the observed value data and the variational probability of the latent variable, the type of each component, and the parameter set by the initialization unit 103, and estimates an optimal type of each component and a parameter thereof by optimizing the type of each component and the parameter so as to maximize the lower bound of the marginal model posterior probability separated for each component of the latent variable model; an optimality determination unit 113 which acquires the observed value data, the type of each component and the parameter thereof estimated by the component optimization unit 112, and the variational probability of the latent variable computed by the latent variable variational probability computation unit 111, and determining whether or not to continue the maximization of the lower bound of the marginal model posterior probability; and a result output unit 121 which outputs the variational probability of the latent variable computed by the latent variable variational probability computation unit and the type of each component and the parameter thereof estimated by the component optimization unit.

The model estimation device described in the following (1) or (2) is also disclosed in each of the exemplary embodiments described above.

(1) The model estimation device may further include a component removal determination unit 114 for acquiring the variational probability of the latent variable and, for each component, setting variational probabilities of the component to 0 if a sum of the variational probabilities is less than a threshold. Such a model estimation device can more quickly estimate a component whose latent variable variational probability sum converges to 0, as 0. The model estimation device is thus capable of model estimation at higher speed.

(2) In the model estimation device, in the case where the optimality determination unit determines to continue the maximization of the lower bound of the marginal model posterior probability, the latent variable variational probability computation unit may acquire the type of each component and the parameter previously estimated by the component optimization unit and the variational probability of the latent variable previously computed by the latent variable variational probability computation unit, and compute again the variational probability of the latent variable so as to maximize the lower bound of the marginal model posterior probability, wherein the component optimization unit acquires the type of each component and the parameter previously estimated by the component optimization unit and the variational probability of the latent variable previously computed by the latent variable variational probability computation unit, and estimates again the optimal type of each component and the parameter thereof by optimizing the type of each component and the parameter so as to maximize the lower bound of the marginal model posterior probability separated for each component of the latent variable model. Such a model estimation device repeats the processes by the latent variable variational probability computation unit and the component optimization unit until it is determined not to continue the maximization of the lower bound, as a result of which the number of latent states, the latent states, and the parameters can be estimated more accurately.

INDUSTRIAL APPLICABILITY

The present invention is applicable to estimation of latent variable models in which the number of parameters increases with samples.

REFERENCE SIGNS LIST 101 data input unit
102 state number setting unit
103 initialization unit 111 latent variable variational probability computation unit
112 component optimization unit
113 optimality determination unit
114 component removal determination unit
121 result output unit

What is claimed is:

1. A model estimation device including a central processing unit, comprising:

a data input unit which acquires observed value data subjected to estimation of a latent variable model, a type of each component constituting the latent variable model, and a state number candidate set of the latent variable model;

a state number setting unit which sets an element for which computation has not been completed yet in the state number candidate set, as the number of states;

an initialization unit which sets initial values of a variational probability of a latent variable, a parameter, and the type of each component;

a latent variable variational probability computation unit which acquires the observed value data and the variational probability of the latent variable, the type of each component, and the parameter set by the initialization unit, and computes the variational probability of the latent variable so as to maximize a lower bound of a marginal model posterior probability;

a component optimization unit which acquires the observed value data and the variational probability of the latent variable, the type of each component, and the parameter set by the initialization unit, and estimates an optimal type of each component and a parameter thereof by optimizing the type of each component and the parameter so as to maximize the lower bound of the marginal model posterior probability separated for each component of the latent variable model;

an optimality determination unit which acquires the observed value data, the type of each component and the parameter thereof estimated by the component optimization unit, and the variational probability of the latent variable computed by the latent variable variational probability computation unit, and determining whether or not to continue the maximization of the lower bound of the marginal model posterior probability; and a result output unit which outputs the variational probability of the latent variable computed by the latent variable variational probability computation unit and the type of each component and the parameter thereof estimated by the component optimization unit, wherein:

the marginal model posterior probability is calculated about a probability distribution so that a parameter $\theta_i$ increases when a sample is removed by integral calculus in a prior distribution, where the observed value is denoted by $x_{ij}$ represented as in the following Expression (1), $$x_{ij} \; i \in \{1, \ldots, N\}, j \in \{1, \ldots, N_i\} \tag{1}$$

the latent variable is denoted by $z_{ij}$, corresponding to the observed value, represented as in the following Expression (2), where K is the number of types of latent states and k is the component, $$z_{ij} \in \{0, 1\}^K, \sum_k z_{ij,k} = 1 \tag{2}$$

suppose the observed variable $x_{ij}$ is created from a regular model that differs according to the value of the latent variable $z_{ij}$, in this case, the observed variable $x_{ij}$ is represented as in the following Expression (3), wherein $\phi$ means a parameter of a probability model, $$x_{ij} \sim P_k(x_{ij}|\phi_{(k)}) \text{ if } z_{ij,k}=1 \tag{3}$$

several types of models are assumed for $P_k$ shown in Expression (3), wherein $P_k$ is the conditional probability of $x_{ij}$ given $\phi_{(k)}$, where the types are denoted by H, the models are denoted by M, a parameter for determining the creation of the latent variable $z_{ij}$ is denoted by $\theta_i$ (where latent variables are created from the same parameter for each i), it is assumed that $z_{ij}$ is created from a given regular model, in this case, $z_{ij}$ is represented as in the following Expression (4), $$z_{ij} \sim P(z_{ij}|\theta_i) \tag{4}$$

where P is the conditional probability of $z_{ij}$ given $\theta_i$ and it is assumed that $p(z_{ij}|\alpha)$ which is a prior distribution having a parameter $\alpha$ and corresponds to $z_{ij}$ marginalizing $\theta_i$ is analytically computed as shown in the following Expression (5) and is a regular model, $$p(z_{ij} \mid \alpha) = \int \prod_f p(z_{ij} \mid \theta_i) p(\theta_i \mid \alpha) d\alpha \tag{5}$$

the marginal model posterior probability is represented as in the following Expression (7-3), derived by substituting the Expression (7-1) into the Expression (7-2), $$p(z_t \cdot \mid \alpha) = \int \prod_i p(z_{ij} \mid \theta_t) p(\theta_t \mid \alpha) d\alpha \tag{7-1}$$

$$\log p(x \mid M) = \log \sum_z \int p(x, z, \theta, \phi, \alpha) d\theta d\phi d\alpha \tag{7-2}$$

$$= \log \sum_z \int p(x \mid z, \phi) p(z \mid \theta, \alpha) p(\theta) p(\phi, \alpha) d\theta d\phi d\alpha$$

$$\log p(x^N \mid M) = \tag{7-3}$$

$$\log \sum_z \int p(\phi, \alpha) \prod_i p(z_i \cdot \mid \alpha) \prod_j p(x_{ij} \mid z_{ij}, \phi) d\phi d\alpha.$$

2. The model estimation device according to claim 1, further comprising:

a component removal determination unit which acquires the variational probability of the latent variable and, for each component, sets variational probabilities of the component to 0 if a sum of the variational probabilities is less than a threshold.

3. The model estimation device according to claim 1, wherein in the case where the optimality determination unit determines to continue the maximization of the lower bound of the marginal model posterior probability:

the latent variable variational probability computation unit acquires the type of each component and the parameter previously estimated by the component optimization unit and the variational probability of the latent variable previously computed by the latent variable variational probability computation unit, and computes again the variational probability of the latent variable so as to maximize the lower bound of the marginal model posterior probability; and the component optimization unit acquires the type of each component and the parameter previously estimated by the component optimization unit and the variational probability of the latent variable previously computed by the latent variable variational probability computation unit, and estimates again the optimal type of each component and the parameter thereof by optimizing the type of each component and the parameter so as to maximize the lower bound of the marginal model posterior probability separated for each component of the latent variable model.

4. The model estimation device according to claim 1, wherein:

the variational probability of the latent variable is denoted by q(z), q̃ is maximum when the value of q at the immediately previous update is used, and $D_k(H)$ is the degree of freedom of the model of the component k in the case where the model of each component is selected in H, the lower bound of the marginal model posterior probability is represented as in the following Expression (10), $$\log p(x^N \mid M) \geq \sum_z q(z^N) \left[ \log q(x_N \mid z_N, \hat{\phi}) + \log p(z_N \mid \hat{\alpha}) - \frac{K}{2} \log N - \sum_k \frac{D_k(H)}{2} \left( \log \sum_{i,j} \tilde{q}(z_{ij,k}) + \frac{\sum_{i,j} z_{ij,k}}{\sum_{i,j} \tilde{q}(z_{ij,k})} - 1 \right) - \log q(z_N) \right] = g(H, q, \tilde{q}, \phi, \alpha). \quad (10)$$

5. A model estimation method comprising:

acquiring observed value data subjected to estimation of a latent variable model, a type of each component constituting the latent variable model, and a state number candidate set of the latent variable model;

setting an element for which computation has not been completed yet in the state number candidate set, as the number of states;

setting initial values of a variational probability of a latent variable, a parameter, and the type of each component;

acquiring the observed value data and the variational probability of the latent variable, the type of each component, and the parameter to which the initial values are set, and computing the variational probability of the latent variable so as to maximize a lower bound of a marginal model posterior probability;

acquiring the observed value data and the variational probability of the latent variable, the type of each component, and the parameter to which the initial values are set, and estimating an optimal type of each component and a parameter thereof by optimizing the type of each component and the parameter so as to maximize the lower bound of the marginal model posterior probability separated for each component of the latent variable model;

acquiring the observed value data, the computed variational probability of the latent variable, and the estimated type of each component and parameter thereof, and determining whether or not to continue the maximization of the lower bound of the marginal model posterior probability; and outputting the computed variational probability of the latent variable and the estimated type of each component and parameter thereof, wherein:

the marginal model posterior probability is calculated about a probability distribution so that a parameter $\theta_i$ increases when a sample is removed by integral calculus in a prior distribution, where the observed value is denoted by $x_{ij}$ represented as in the following Expression (1), $$x_{ij} \; i \in \{1, \ldots, N\}, \; j \in \{1, \ldots, N_i\} \quad (1)$$

the latent variable is denoted by $z_{ij}$, corresponding to the observed value, represented as in the following Expression (2), where K is the number of types of latent states and k is the component, $$z_{ij} \in \{0, 1\}^K, \; \sum_k z_{ij,k} = 1 \quad (2)$$

suppose the observed variable $x_{ij}$ is created from a regular model that differs according to the value of the latent variable $z_{ij}$, in this case, the observed variable $x_{ij}$ is represented as in the following Expression (3), where ϕ means a parameter of a probability model, $$x_{ij} \sim P_k(x_{ij} \mid \phi_{(k)}) \; \text{if} \; z_{ij,k}=1 \quad (3)$$

several types of models are assumed for $P_k$ shown in Expression (3), where $P_k$ is the conditional probability of $x_{ij}$ given $\phi_{(k)}$, where the types are denoted by H, the models are denoted by M, a parameter for determining the creation of the latent variable $z_{ij}$ is denoted by $\theta_i$ (where latent variables are created from the same parameter for each i), it is assumed that $z_{ij}$ is created from a given regular model, in this case, $z_{ij}$ is represented as in the following Expression (4), $$z_{ij} \sim P(z_{ij} \mid \theta_i) \quad (4)$$

where P is the conditional probability of $z_{ij}$ given $\theta_i$ and it is assumed that $p(z_{ij} \mid \alpha)$ which is a prior distribution having a parameter α and corresponds to $z_{ij}$ marginalizing $\theta_i$ is analytically computed as shown in the following Expression (5) and is a regular model, $$p(z_{ij} \mid \alpha) = \int \prod_f p(z_{ij} \mid \theta_i) p(\theta_i \mid \alpha) d\alpha \quad (5)$$

the marginal model posterior probability is represented as in the following Expression (7-3), derived by substituting the Expression (7-1) into the Expression (7-2), $$p(z_t \cdot \mid \alpha) = \int \prod_i p(z_{ij} \mid \theta_t) p(\theta_t \mid \alpha) d\alpha \quad (7-1)$$

-continued $$\log p(x \mid M) = \log \sum_z \int p(x, z, \theta, \phi, \alpha) d\theta d\phi d\alpha \quad (7-2)$$

$$= \log \sum_z \int p(x \mid z, \phi) p(z \mid \theta, \alpha) p(\theta) p(\phi, \alpha) d\theta d\phi d\alpha$$

$$\log p(x^N \mid M) = \quad (7-3)$$

$$\log \sum_z \int p(\phi, \alpha) \prod_i p(z_i \cdot \mid \alpha) \prod_j p(x_{ij} \mid z_{ij}, \phi) d\phi d\alpha.$$

6. The model estimation method according to claim 5, further comprising:
  acquiring the variational probability of the latent variable and, for each component, setting variational probabilities of the component to 0 if a sum of the variational probabilities is less than a threshold.

7. The model estimation method according to claim 5, wherein in the case of determining to continue the maximization of the lower bound of the marginal model posterior probability:
  the previously estimated type of each component and parameter and the previously computed variational probability of the latent variable are acquired, and the variational probability of the latent variable is computed again so as to maximize the lower bound of the marginal model posterior probability; and
  the previously estimated type of each component and parameter and the previously computed variational probability of the latent variable are acquired, and the optimal type of each component and the parameter thereof are estimated again by optimizing the type of each component and the parameter so as to maximize the lower bound of the marginal model posterior probability separated for each component of the latent variable model.

8. The model estimation method according to claim 5, wherein:
  the variational probability of the latent variable is denoted by q(z), $\tilde{q}$ is maximum when the value of q at the immediately previous update is used,
  and $D_k(H)$ is the degree of freedom of the model of the component k in the case where the model of each component is selected in H,
  the lower bound of the marginal model posterior probability is represented as in the following Expression (10), $$\log p(x^N \mid M) \geq \sum_z q(z^N) \left[ \log q(x_N \mid z_N, \hat{\phi}) + \log p(z_N \mid \hat{\alpha}) - \right.$$

$$\frac{K}{2} \log N - \sum_k \frac{D_k(H)}{2} \left( \log \sum_{i,j} \tilde{q}(z_{ij,k}) + \frac{\sum_{i,j} z_{ij,k}}{\sum_{i,j} \tilde{q}(z_{ij,k})} - 1 \right) -$$

$$\left. \log q(z_N) \right] = g(H, q, \tilde{q}, \phi, \alpha). \quad (10)$$

9. A computer-readable non-transitory information storage medium storing a model estimation program that, when executed by an information processing device, causes execution of a method comprising:
  acquiring observed value data subjected to estimation of a latent variable model, a type of each component constituting the latent variable model, and a state number candidate set of the latent variable model;
  setting an element for which computation has not been completed yet in the state number candidate set, as the number of states;
  setting initial values of a variational probability of a latent variable, a parameter, and the type of each component;
  acquiring the observed value data and the variational probability of the latent variable, the type of each component, and the parameter to which the initial values are set, and computing the variational probability of the latent variable so as to maximize a lower bound of a marginal model posterior probability;
  acquiring the observed value data and the variational probability of the latent variable, the type of each component, and the parameter to which the initial values are set, and estimating an optimal type of each component and a parameter thereof by optimizing the type of each component and the parameter so as to maximize the lower bound of the marginal model posterior probability separated for each component of the latent variable model;
  acquiring the observed value data, the computed variational probability of the latent variable, and the estimated type of each component and parameter thereof, and determining whether or not to continue the maximization of the lower bound of the marginal model posterior probability; and
  outputting the computed variational probability of the latent variable and the estimated type of each component and parameter thereof,
wherein:
  the marginal model posterior probability is calculated about a probability distribution so that a parameter $\theta_i$ increases when a sample is removed by integral calculus in a prior distribution,
  where the observed value is denoted by $x_{ij}$ represented as in the following Expression (1), $$x_{ij} \; i \in \{1, \ldots, N\}, j \in \{1, \ldots, N_i\} \quad (1)$$

the latent variable is denoted by $z_{ij}$, corresponding to the observed value, represented as in the following Expression (2), where K is the number of types of latent states and k is the component, $$z_{ij} \in \{0, 1\}^K, \sum_k z_{ij,k} = 1 \quad (2)$$

suppose the observed variable $x_{ij}$ is created from a regular model that differs according to the value of the latent variable $z_{ij}$, in this case, the observed variable $x_{ij}$ is represented as in the following Expression (3), where $\phi$ means a parameter of a probability model, $$x_{ij} \sim P_k(x_{ij} \mid \phi_{(k)}) \text{ if } z_{ij,k}=1 \quad (3)$$

several types of models are assumed for $P_k$ shown in Expression (3), where $P_k$ is the conditional probability of $x_{ij}$ given $\phi_{(k)}$, where the types are denoted by H, the models are denoted by M, a parameter for determining the creation of the latent variable $z_{ij}$ is denoted by $\theta_i$ (where latent variables are created from the same parameter for each i), it is assumed that $z_{ij}$ is created from a given regular model, in this case, $z_{ij}$ is represented as in the following Expression (4), $$z_{ij} \sim P(z_{ij}|\theta_i) \qquad (4)$$

where P is the conditional probability of $z_{ij}$ given $\theta_i$ and it is assumed that $p(z_{ij}|\alpha)$ which is a prior distribution having a parameter $\alpha$ and corresponds to $z_{ij}$ marginalizing $\theta_i$ is analytically computed as shown in the following Expression (5) and is a regular model, $$p(z_{ij}|\alpha) = \int \prod_f p(z_{ij}|\theta_i) p(\theta_i|\alpha) d\alpha \qquad (5)$$

the marginal model posterior probability is represented as in the following Expression (7-3), derived by substituting the Expression (7-1) into the Expression (7-2), $$p(z_i \cdot |\alpha) = \int \prod_i p(z_{ij}|\theta_i) p(\theta_i|\alpha) d\alpha \qquad (7-1)$$

$$\log p(x|M) = \log \sum_z \int p(x, z, \theta, \phi, \alpha) d\theta d\phi d\alpha \qquad (7-2)$$

$$= \log \sum_z \int p(x|z, \phi) p(z|\theta, \alpha) p(\theta) p(\phi, \alpha) d\theta d\phi d\alpha$$

$$\log p(x^N|M) = \qquad (7-3)$$

$$\log \sum_z \int p(\phi, \alpha) \prod_i p(z_i \cdot |\alpha) \prod_j p(x_{ij}|z_{ij}, \phi) d\phi d\alpha.$$

10. The computer-readable non-transitory information storage medium according to claim 9 storing the model estimation program that, when executed by the information processing device, causes the execution of the method further comprising:
acquiring the variational probability of the latent variable and, for each component, setting variational probabilities of the component to 0 if a sum of the variational probabilities is less than a threshold.

11. The computer-readable non-transitory information storage medium according to claim 9 storing the model estimation program that, when executed by the information processing device, causes the execution of the method wherein, in the case of determining to continue the maximization of the lower bound of the marginal model posterior probability:
the previously estimated type of each component and parameter and the previously computed variational probability of the latent variable are acquired, and the variational probability of the latent variable is computed again so as to maximize the lower bound of the marginal model posterior probability; and
the previously estimated type of each component and parameter and the previously computed variational probability of the latent variable are acquired, and the optimal type of each component and the parameter thereof are estimated again by optimizing the type of each component and the parameter so as to maximize the lower bound of the marginal model posterior probability separated for each component of the latent variable model.

12. The computer-readable non-transitory information storage medium according to claim 9 storing the model estimation program that, when executed by the information processing device, causes the execution of the method, wherein:
the variational probability of the latent variable is denoted by q(z), $\tilde{q}$ is maximum when the value of q at the immediately previous update is used,
and $D_k(H)$ is the degree of freedom of the model of the component k in the case where the model of each component is selected in H,
the lower bound of the marginal model posterior probability is represented as in the following Expression (10), $$\log p(x^N|M) \geq \sum_z q(z^N) \left[ \log q(x_N|z_N, \hat{\phi}) + \log p(z_N|\hat{\alpha}) - \frac{K}{2} \log N - \sum_k \frac{D_k(H)}{2} \left( \log \sum_{i,j} \tilde{q}(z_{ij,k}) + \frac{\sum_{i,j} z_{ij,k}}{\sum_{i,j} \tilde{q}(z_{ij,k})} - 1 \right) - \log q(z_N) \right] = g(H, q, \tilde{q}, \phi, \alpha).$$

* * * * *